United States Patent [19]

Dubot et al.

[11] 4,139,802

[45] Feb. 13, 1979

[54] LIGHT-RESPONSIVE ELECTRIC SWITCH

[75] Inventors: Guy Dubot; Jacques Lemercier, both of Saverne, France

[73] Assignee: Fabrique d'Horlogerie la Vedette, S.A., Saverne, France

[21] Appl. No.: 808,693

[22] Filed: Jun. 21, 1977

[30] Foreign Application Priority Data

Jan. 31, 1977 [FR] France .................................. 77 03398

[51] Int. Cl.² ...................... H05B 37/02; H05B 39/04
[52] U.S. Cl. ..................................... 315/151; 315/156; 315/157; 250/214 AL; 250/214 C
[58] Field of Search ............... 315/151, 156, 157, 159; 250/214 AL, 214 C

[56] References Cited

U.S. PATENT DOCUMENTS

| 3,648,107 | 3/1972 | Rydborn .................... 250/214 AL X |
| 3,654,514 | 4/1972 | Kappenhagen ...................... 315/156 |
| 3,961,183 | 6/1976 | Dubot et al. ...................... 315/159 X |
| 4,008,415 | 2/1977 | De Avila-Erafin et al. ........ 315/156 |

Primary Examiner—Alfred E. Smith
Assistant Examiner—Charles F. Roberts
Attorney, Agent, or Firm—Young & Thompson

[57] ABSTRACT

The disclosure is of a light-responsive electric switch which is characterized in that it is constituted mainly by a photoresistive cell inserted in a voltage-divider bridge of which the voltage variations, as functions of the illumination, control a standard integrated circuit comprising four NAND gates which, through the intermediary of a transistor, actuate a triac controlling the illumination circuit.

4 Claims, 1 Drawing Figure

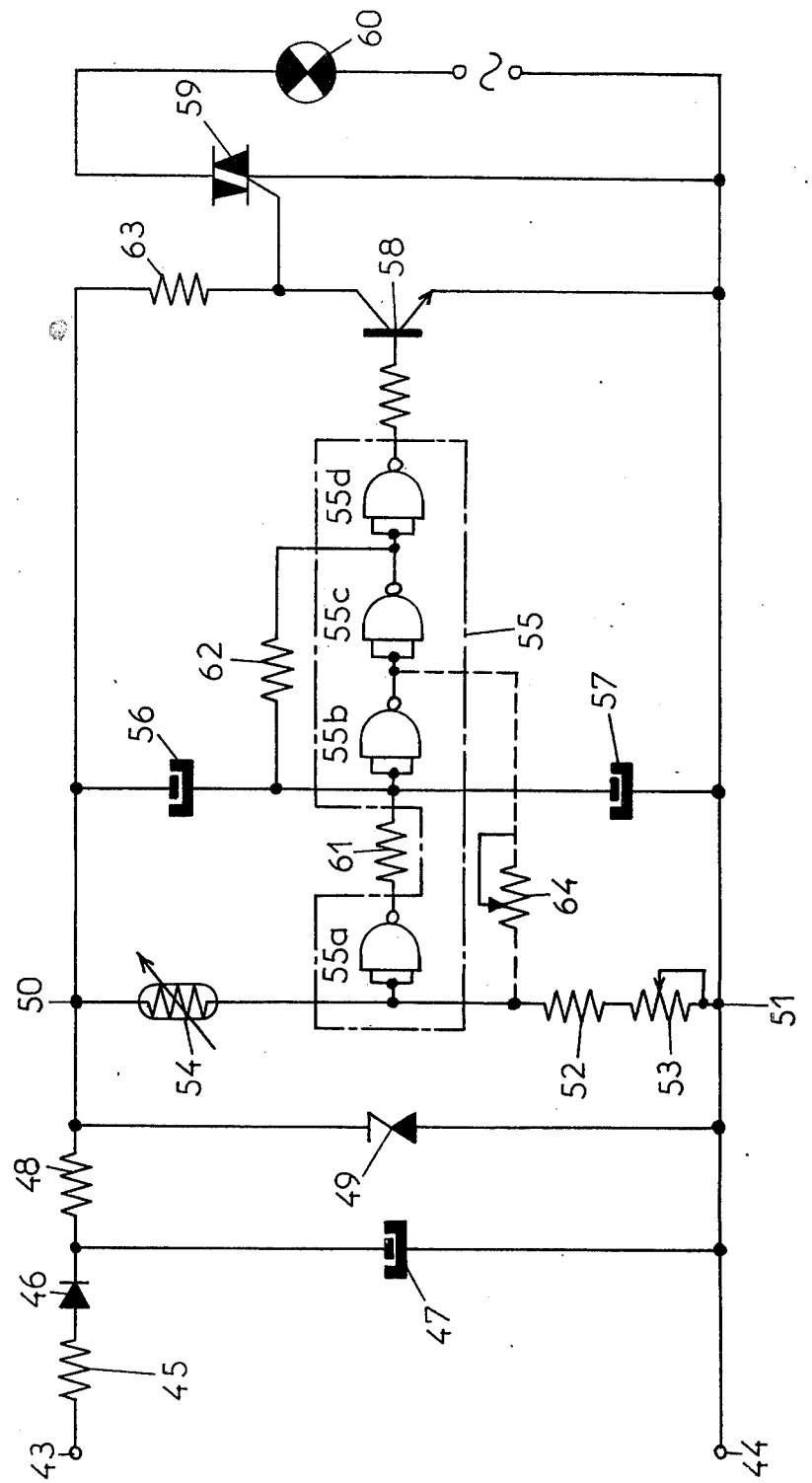

LIGHT-RESPONSIVE ELECTRIC SWITCH

INTRODUCTION AND BACKGROUND OF THE INVENTION

In our earlier U.S. Pat. No. 3,961,183, we have proposed a twilight-responsive switch characterised in that it is composed, on the one hand, by an electronic circuit constituted in the case of a supply of continuous current, by a voltage divider bridge comprising a fixed resistor and a variable resistor constituting the photoresistance, by an amplifying stage and a bistable trigger circuit which controls, following each change of state conditioned by the illumination of the photoresistance, and by the intermediary of a changeover switch and a transistor amplifier, a motor, and, on the other hand, by a speed-reduction gearing meshing with a pinion fixed upon the shaft of this motor, by cams rigid with the final pinion shaft of the speed-reduction gearing, and by one or more contacts closing or opening one or more illuminating circuits, this electro-mechanical arrangement, by its design, permitting easy achievement of a duration of delay in the range from a few seconds to many minutes.

The present invention has as one object to facilitate a modification of construction of a twilight-responsive switch, permitting with simple and low-cost means, and with a minimum of bulk, the controlling of an electric circuit, particularly for illumination, with an adequate sensitivity.

BRIEF SUMMARY OF THE INVENTION

For this purpose the twilight-responsive switch according to the present invention is constituted mainly by a photoresistant cell inserted in a voltage divider bridge of which the variations of voltage as a function of the illumination falling upon the said cell control a standard integrated circuit comprising four NAND gates, which integrated circuit by the intermediary of a transistor actuates a triac controlling an illumination circuit.

FURTHER DESCRIPTION AND ADVANTAGES OF THE INVENTION

In conformity with a feature of the invention, the twilight-responsive switch is provided with two polarised capacitors connected in the circuit in such a manner that their respective leakage output currents are compensated, and permitting a very small differential of the delay in the engagement and the disengagement of the circuit of utilisation necessary in order to avoid complete extinction or complete illumination with undue rapidity.

According to a modification of embodiment of the invention the twilight-responsive switch is combined, in the interior of a single casing, with a clockwork switch, in such a manner as to permit the total or partial interruption of the illumination circuit during predetermined hours, and the cutting of the illumination at night during certain days of the week, when the clockwork switch is equipped with a weekly program.

The invention will be better understood due to the following description which relates to a preferred manner of embodiment, given by way of non-limitative example, and explained with reference to the accompanying drawing. In the said drawing.

BRIEF DESCRIPTION OF THE VIEW IN THE DRAWING

The single FIGURE is an electronic circuit diagram of a preferred twilight-responsive switch according to the invention.

DETAILED DESCRIPTION OF THE PREFERRED EMBODIMENT

In conformity with the invention, and as the accompanying drawing shows, the twilight-responsive switch, supplied at its terminals 43 and 44 with a 220 volt alternating current, is constituted by a resistor 45 and a diode 46 intended to reduce and rectify the voltage to 10 volts, for example, by a smoothing capacitor 47, by a resistor 48 and a Zener diode 49 serving to regulate the voltage, and by a voltage divider to the terminals 50 and 51 of which is applied the rectified voltage, and which comprises, on the one hand, a fixed resistor 52 and a potentiometer 53, and, on the other hand, a variable resistor 54 constituting the photoresistance, of which the ohmic resistance is inversely proportional to its incident illumination, a standard integrated circuit 55 of the CMOS technology provided with four NAND gates 55a to 55d, two polarised capacitors 56 and 57, and a transistor 58 in the collector circuit of which is connected the gate of a triac 59 controlling the illumination circuit 60.

The switch in conformity with the invention functions in the following manner:

During reduction of the illumination of the photoresistance 54, the resistance of this latter rises and causes an increase of the potential difference at its terminals. Hence it results that the voltage at the input of the gate 55a reduces until it descends below the threshold of switching-over of the gate, this threshold being equivalent to a low level at the input and therefore to a high level at the output.

The potentiometer 52 permits the regulation of the value of the threshold of closing of this gate, that is to say of regulating the sensitivity of the twilight-responsive switch.

After the switching-over of the gate 55a, the capacitor 56 discharges through a resistor 61, whilst the capacitor 57 charges, which has for its effect to delay the control of the gate 55b and thus to introduce a delay in the closing and opening of the utilisation circuit 60 with a very small differential.

As soon as the voltage at the terminals of the capacitor 57 reaches the threshold of switching-over of the gate 55b, the output from the gate 55c rises to high level and a counter-reactive resistor 62 makes it possible to obtain a sharp impulse, and, from this fact, a very decisive switch-over.

The input of the gate 55a having a low level, the output of the gate 55d has likewise a low level, and the transistor 58 is blocked, in such a manner that the voltage at the terminals of the resistor 63 is maximal and is applied to the gate of the triac 59, which becomes conductive and permits the supply of current to the lamp circuit 60.

If, on the contrary, the photoresistance 54 is progressively more illuminated its resistance decreases. The voltage at the input of the gate 55a then increases until it attains its switching-over threshold, which is equivalent to a high level at its input and to a low level at its output. Then the capacitor 57 discharges through the resistor 61, whilst the capacitor 56 becomes charged.

When the voltage at the terminals of the capacitor 56 attains the threshold for switching-over of the gate 55b, the output of the gate 55c changes to low level, whilst the output of the gate 55d is at high level. It follows that the transistor 58 becomes conductive, the triac 59 then being blocked and interrupting the supply of current to the lamp circuit 60.

In the particular instance where the illumination of the photoresistance 54 is influenced by the lamp in the circuit 60, in conformity with a feature of the invention there is provided a circuit connection between the input to the gate 55a and the output from the gate 55b of an adjustable resistor 64 in order to compensate for the said illumination.

Due to the invention it is possible to construct a switch allowing the control of an electric illumination circuit, particularly for domestic applications such as, for example, the illumination of gardens, of a porchway, of stairways, or the like.

It will be well understood that the invention is not limited to the manner of construction described and represented in the accompanying drawing. Modifications remain possible, notably from the point of view of the constitution of the various components, without departing in any way from the scope of protection of the invention.

What is claimed is:

1. A twilight-responsive switch, comprising an electronic circuit comprising a voltage divider including a fixed resistor, a potentiometer allowing adjustment of the sensitivity, and a variable resistor constituting a photoresistance, a standard integrated circuit of the CMOS technology provided with four NAND gates, a delay circuit formed by two capacitors and a resistor, and an output stage comprising a transistor in the collector circuit of which is connected the gate of a triac which controls, as a function of the illumination of the photoresistance, the lighting up or the extinction of a lamp.

2. A switch as claimed in claim 1, adapted to be supplied with alternating current the electronic circuit having at the input a resistor, a diode, and a smoothing capacitor, as well as a voltage regulator composed of a resistor and a Zener diode.

3. A switch as claimed in claim 1, and two polarised capacitors connected in the circuit in such a manner that their respective leakage currents are compensated and permit the achievement of a delay in the connection and the disconnection of the lamp with a very small differential.

4. A switch as claimed in claim 1, and an adjustable resistor between the input to the first gate and the output from the second gate of the integrated circuit, which allows compensation for the influence of the illumination from the lamp upon the photoresistance when this latter is placed in the proximity of the lamp.

* * * * *